US011989827B2

(12) United States Patent
Cheng (10) Patent No.: US 11,989,827 B2
(45) Date of Patent: May 21, 2024

(54) METHOD, APPARATUS AND SYSTEM FOR GENERATING A THREE-DIMENSIONAL MODEL OF A SCENE

(71) Applicant: Realsee (Beijing) Technology Co., Ltd., Beijing (CN)

(72) Inventor: Xianyu Cheng, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/362,438

(22) Filed: Jun. 29, 2021

(65) Prior Publication Data

US 2022/0139030 A1 May 5, 2022

(30) Foreign Application Priority Data

Oct. 29, 2020 (CN) .......................... 202011180650.0

(51) Int. Cl.
*G06T 17/05* (2011.01)
*G06T 7/50* (2017.01)
*G06T 7/73* (2017.01)
*G06T 19/00* (2011.01)

(52) U.S. Cl.
CPC ................ *G06T 17/05* (2013.01); *G06T 7/50* (2017.01); *G06T 7/75* (2017.01); *G06T 19/006* (2013.01)

(58) Field of Classification Search
CPC .. G06T 17/05; G06T 7/50; G06T 7/75; G06T 19/006
See application file for complete search history.

(56) References Cited

U.S. PATENT DOCUMENTS

| 10,306,203 | B1* | 5/2019 | Goyal | H04N 13/271 |
| 2012/0236121 | A1* | 9/2012 | Park | H04N 13/254 |
| | | | | 348/46 |
| 2012/0306876 | A1* | 12/2012 | Shotton | G06T 17/10 |
| | | | | 345/424 |
| 2017/0061701 | A1* | 3/2017 | Mittal | G06T 5/002 |
| 2019/0147220 | A1* | 5/2019 | McCormac | G06V 20/41 |
| | | | | 382/103 |
| 2019/0156504 | A1* | 5/2019 | Jiang | G06T 7/85 |
| 2019/0394441 | A1* | 12/2019 | Simek | H04N 13/271 |
| 2021/0166477 | A1* | 6/2021 | Bunkasem | G06K 9/6262 |
| 2021/0327119 | A1* | 10/2021 | Malin | G06T 15/04 |

* cited by examiner

*Primary Examiner* — Sing-Wai Wu
*Assistant Examiner* — Khoa Vu
(74) *Attorney, Agent, or Firm* — Leydig, Voit & Mayer, Ltd.

(57) ABSTRACT

A method for generating a 3D model of a scene is disclosed herein. An imaging device included in a 3D modeling system obtains a first set of depth data. The first set of depth data includes pixels of a plurality of frames of depth images. A scanning device included in the 3D modeling system obtains a second set of depth data. The second set of depth data includes depth data points of a plurality of image frames. The 3D modeling system receives a set of color data of the scene. The set of color data includes pixels of a plurality of color images. The 3D modeling system generates the 3D model of the scene based on the set of color data, the first set of depth data and the second set of depth data. The 3D modeling system causes display of the 3D model of the scene.

16 Claims, 7 Drawing Sheets

METHOD, APPARATUS AND SYSTEM FOR GENERATING A THREE-DIMENSIONAL MODEL OF A SCENE

CLAIM OF PRIORITY

This application claims the benefit of priority to Chinese Patent Application No. 202011180650.0, filed Oct. 29, 2020, the entire contents of which is incorporated herein by reference.

TECHNICAL FIELD

The present disclosure relates to the field of three-dimensional (3D) reconstruction technology and, more specifically, to image processing for generating virtual reality data.

BACKGROUND 3D reconstruction is a process of establishing a mathematical model suitable for computer representation and processing of 3D objects. In the computing environment, the processing, operation and analysis of 3D objects can be realized through the established 3D model. 3D reconstruction technology is a key technology for establishing a virtual reality environment that expresses the objective world in a computer. Generally, the 3D reconstruction process may include steps such as image acquisition, camera calibration, feature extraction, stereo matching, and 3D reconstruction.

Existing 3D reconstruction technologies usually only use depth cameras or light detection and ranging (LIDAR) systems for 3D modeling. The depth cameras can provide high-resolution depth data. However, a high-precision depth data range for a depth camera is limited, since the accuracy of the depth data obtained by the depth camera depends heavily on the distance between the depth camera and the object in a scene. Further, the visible distance of a depth camera is typically small limited by its power or resolution. By contrast, a LIDAR system provides high-precision depth data for a wide depth range, since the accuracy of the depth data obtained by a LIDAR system is high and relatively consistent for a wide depth range. However, the resolution of the depth data obtained by the LIDAR system is low. As such, the resulting point cloud generated for the 3D modeling is relatively sparse, thus difficult to model small objects (such as water pipes, pens, etc.) with sufficient details.

Thus, there is a need for providing robust 3D reconstruction solutions to take into account the breadth of the detection range of a large scene, the accuracy, and the resolution of the generated 3D model.

SUMMARY

A method, computer readable medium, system and apparatus are disclosed for generating a 3D model of a scene. Depth data obtained by an imaging device and a scanning device may be combined, such that a high-resolution depth image with consistent high accuracy for a 3D model of the scene may be generated.

In some embodiments, a method is provided for generating a 3D model of a scene. The method comprises obtaining a first set of depth data by an imaging device included in a 3D modeling system, obtaining a second set of depth data by a scanning device included in the 3D modeling system, receiving a set of color data of the scene by the 3D modeling system, generating the 3D model of the scene based on the set of color data, the first set of depth data and the second set of depth data, and causing display of the 3D model of the scene. The first set of depth data includes pixels of a plurality of frames of depth images. the second set of depth data includes depth data points of a plurality of image frames.

In some embodiments, each depth image included in the first set of depth data is a first data, and each image frame included in the second set of depth data is a second data. The method further comprises determining a plurality of data pairs, and determining a positional relationship between the first set of depth data and the second set of depth data based on the plurality of data pairs. Each of the plurality of data pairs includes a first data and a corresponding second data. The first data and the corresponding second data in a data pair include an identical target object.

In some embodiments, each first data is tagged with a first set of extrinsic parameters indicating the pose information of the imaging device. Each second data is tagged with a second set of extrinsic parameters indicating the pose information of the scanning device. The method further comprises determining a first pose related to the first data based on the first set of extrinsic parameters, determining a second pose related to the second data based on the second set of extrinsic parameters, and determining the data pair including the first data and the second data in response to the first pose and the second pose are identical.

In some embodiments, the first set of extrinsic parameters and a second set of extrinsic parameters are output from a same attitude sensor comprised in the 3D modeling system.

In some embodiments, each first data is labeled with a first timestamp indicating the moment of obtaining the first data by the imaging device. Each second data is labeled with a second timestamp indicating the moment of obtaining the second data by the scanning device. The first data and the corresponding second data in a data pair have a time interval smaller than a threshold.

In some embodiments, the first data and the corresponding second data in a data pair are identified with one or more identical objects.

In some embodiments, the method further comprises determining a threshold depth value, and removing one or more data points in the first set of depth data in response to the depth value of the one or more data points being greater than the threshold depth value.

In some embodiments, the method further comprises determining one or more image areas in the generated 3D model of the scene below a resolution threshold, obtaining a first set of filling data by the imaging device included in the 3D modeling system, and supplementing the first set of filling data to the generated 3D model to generate a new 3D model of the scene. The first set of filling data includes a plurality of depth images.

In some embodiments, the method further comprises determining one or more image area in the generated 3D model of the scene that do not have sufficient depth data points, obtaining a second set of filling data by the scanning device included in the 3D modeling system, and supplementing the second set of filling data to the generated 3D model to generate a new 3D model of the scene. The second set of filling data includes depth data points of a plurality of image frames.

In some embodiments, the imaging device obtains the plurality of depth images at a first frame rate. The scanning device obtains the plurality of image frames at a second frame rate.

In some embodiments, the 3D modeling system includes a display that displays the 3D model of the scene based on the obtained depth data in real time.

In some embodiments, a system for generating a 3D model of a scene is provided. The system comprises an imaging device, a scanning device, and one or more processors. The imaging device is configured to obtain a first set of depth data. The first set of depth data includes pixels of a plurality of frames of depth images. The scanning device is configured to obtain a second set of depth data. The second set of depth data includes depth data points of a plurality of image frames. The one or more processors are configured to receive the first set of depth data from the imaging device, the second set of depth data from the scanning device, and a set of color data, generate the 3D model of the scene based on the set of color data, the first set of depth data and the second set of depth data, and output the generated 3D model of the scene. The set of color data includes pixels of a plurality of color images.

In some embodiments, each depth image included in the first set of depth data is a first data. Each image frame included in the second set of depth data is a second data. The one or more processors included in the 3D modeling system are further configured to determine a plurality of data pairs, and determine a position relationship between the first set of depth data and the second set of depth data based on the plurality of data pairs. Each of the plurality of data pairs includes a first data and a corresponding second data. The first data and the corresponding second data comprise an identical target object.

In some embodiments, the 3D modeling system further comprises one or more attitude sensors. The one or more attitude sensors are configured to output extrinsic parameters indicating pose information of the imaging device and the scanning device included in the 3D modeling system. Each first data that is obtained by the imaging device is tagged with a first set of extrinsic parameters indicating the pose information of the imaging device. Each second data that is obtained by the scanning device is tagged with a second set of extrinsic parameters indicating the pose information of the scanning device. The one or more processors included in the 3D modeling system are further configured to determine a first pose related to the first data based on the first set of extrinsic parameters, determine a second pose related to the second data based on the second set of extrinsic parameters, and determine the data pair including the first data and the second data in response to the first pose and the second pose are identical.

In some embodiments, each first data is labeled with a first timestamp indicating the moment of obtaining the first data by the imaging device. Each second data is labeled with a second timestamp indicating the moment of obtaining the second data by the scanning device. The first data and the corresponding second data in a data pair have a time interval smaller than a threshold.

In some embodiments, the first data and the corresponding second data in a data pair are identified with one or more identical objects.

In some embodiments, the one or more processors included in the 3D modeling system are further configured to determine a threshold depth value, and remove one or more data points in the first set of depth data in response to the depth value of the one or more data points being greater than the threshold depth value.

In some embodiments, the one or more processors included in the 3D modeling system are further configured to determine one or more images areas in the generated 3D model of the scene below a resolution threshold, receive a first set of filling data from the imaging device, and supplement the first set of filling data to the generated 3D model to generate a new 3D model of the scene. The first set of filling data includes pixels of a plurality of depth images.

In some embodiments, the one or more processors included in the 3D modeling system are further configured to determine one or more image areas in the generated 3D model of the scene that do not have sufficient depth data points, receive a second set of filling data from the scanning device, and supplement the second set of filling data to the generated 3D model to generate a new 3D model of the scene. The second set of filling data includes depth data points of a plurality of image frames.

In some embodiments, a non-transitory computer-readable medium is provided. The non-transitory computer-readable medium has computer-executable instructions stored thereon, which, when executed by one or more processor, cause a processor to facilitate obtaining a first set of depth data by an imaging device included in a 3D modeling system, obtaining a second set of depth data by a scanning device included in the 3D modeling system, receiving a set of color data of the scene by the 3D modeling system, generating the 3D model of the scene based on the set of color data, the first set of depth data and the second set of depth data, and causing display of the 3D model of the scene. The first set of depth data includes pixels of a plurality of frames of depth images. The second set of depth data includes depth data points of a plurality of image frames.

BRIEF DESCRIPTION OF THE DRAWINGS

The subject technology will be described in even greater detail below based on the exemplary figures, but is not limited to the samples. All features described and/or illustrated herein can be used alone or combined in different combinations. The features and advantages of various examples will become apparent by reading the following detailed description with reference to the attached drawings which illustrate the following.

DETAILED DESCRIPTION

The present disclosure described herein provides solutions for generating a 3D model of a scene. The depth information is obtained by using an imaging device and a scanning device. The imaging device, such as a depth camera, is configured to obtain depth data that is less than a threshold value. The depth data obtained by the imaging device includes high-resolution depth data, thus providing fine details in the 3D model. The scanning device, such as a light detection and ranging (LIDAR) system, is configured to obtain depth data with a consistent accuracy in a wide range of shooting distances such that the distant objects in the 3D model may be generated with high accuracy. The depth data points obtained by the imaging device and the scanning device are combined based on positional relationships among the depth data points. In some instances, the positional relationships are determined based on the pose information of the data acquisition devices, such as the imaging device and the scanning device. In other instances, the positional relationships are determined by identifying a number of target objects that exist in multiple images and/or frames of the depth data points. Additionally, and/or alternatively, the data points in the 3D model of the scene are rendered according to color information provided by a color imaging device. As such, a 3D model of a scene that includes both depth and color information is generated.

By applying the solutions provided herein, a 3D model of the scene with high-resolution and high accuracy may be generated, thus providing improved user experience for simulated VR applications.

Figure 1:
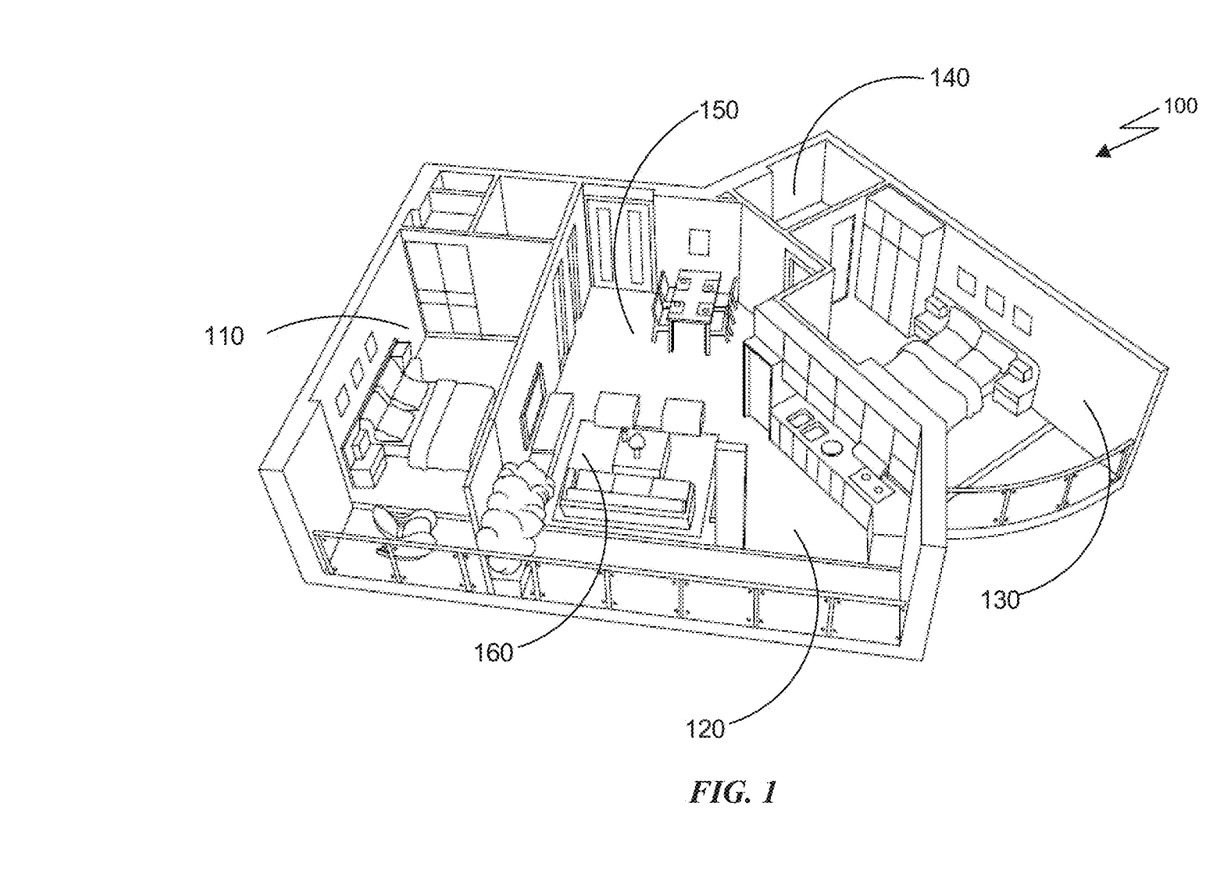
FIG. 1 illustrates an exemplary 3D virtual reality (VR) environment in accordance with one or more embodiments.

FIG. 1 illustrates an exemplary 3D VR environment 100, in accordance with some embodiments. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some instances, a functional space may correspond to an enclosed or partially enclosed space within or adjacent to a room. For example, functional space 140 may correspond to a closet. In other instances, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
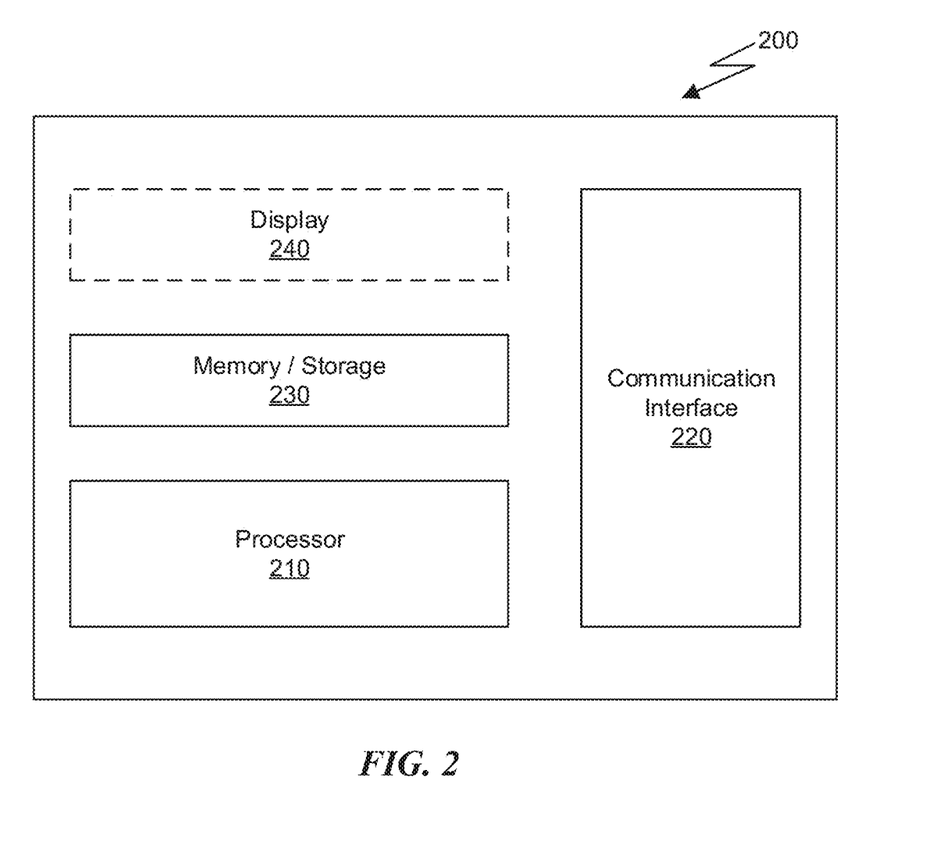
FIG. 2 illustrates a block diagram of an exemplary computer system in accordance with one or more embodiments.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and/or a static RAM.

Processor 210 may be configured to perform the operations in accordance with the instructions stored in memory 230. Processor 210 may include any appropriate type of general-purpose or special-purpose microprocessor, digital signal processor, microcontroller, or the like. In some examples, processor 210 may be configured as a separate processor module dedicated to performing one or more specific operations disclosed herein. In other examples, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
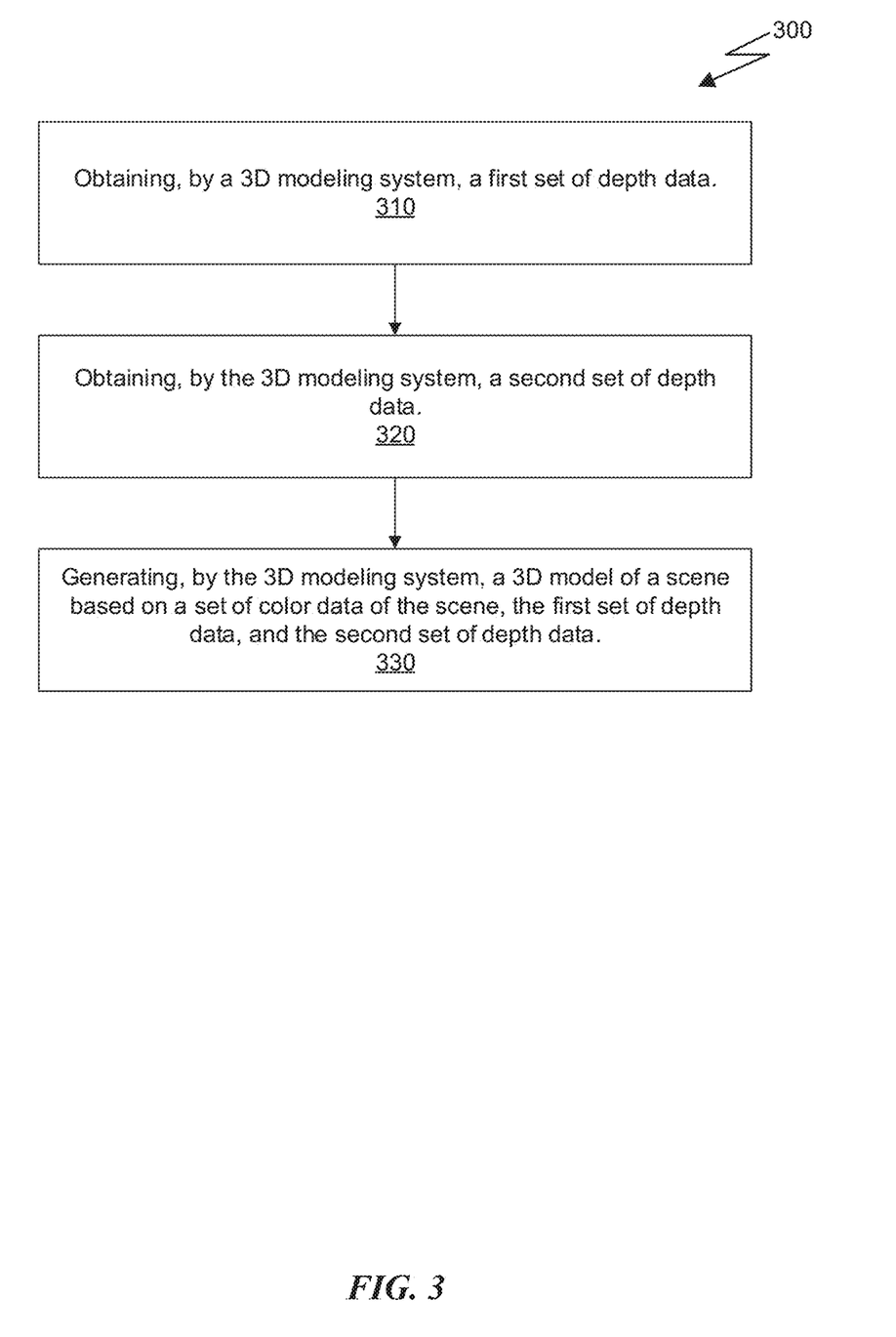
FIG. 3 illustrates a process for generating a 3D model of a scene in accordance with one or more embodiments.

FIG. 3 is an exemplary process 300 for generating a 3D model of a scene in accordance with one or more embodiments. Process 300 may be performed by a 3D modeling system and/or device 200 according to the computer-executable instructions stored in memory 230 shown in FIG. 2. The 3D modeling system may include an imaging device, a scanning device, and/or one or more attitude sensors. Additionally, and/or alternatively, the 3D modeling system may further include one or more platforms, motors, and/or actuators to position and/or re-position one or more devices of the 3D modeling system such as the imaging device and/or the scanning device. For instance, the 3D modeling system may include one or more platforms, motors, and/or actuators to rotate and/or move the imaging device separate from the scanning device. In some instances, the 3D modeling system may include a color imaging device (e.g., color camera) that is configured to obtain color data associated with an image. In other instances, the 3D modeling system may obtain the color data from an external color imaging device that is separate from the 3D modeling system.

The imaging device may be a depth camera and configured to capture depth images of a scene. Each depth image of the scene comprises a plurality of pixels and each pixel comprises a depth value. The depth value may indicate a distance between the representative object depicted by one or more pixels and a position of the imaging device. The scanning device (e.g., a LIDAR device) may be configured to scan the scene to collect a plurality of depth data points indicating a plurality of depth values. The one or more attitude sensors may be configured to output a plurality of extrinsic parameters. The extrinsic parameters include position and rotation information associated with the imaging device and the scanning device. For instance, the set of extrinsic parameters may include a pose matrix, which includes a 3×3 rotation matrix and a 3×1 translation vector. In some variations, the imaging device may capture multiple images (e.g., five images) and the attitude sensors may determine one or more pose matrices for the images. For example, the imaging device may be stationary (e.g., in the same position) when capturing the multiple images and the attitude sensor may obtain/determine a single pose matrix for the multiple images. The pose matrix may indicate the rotation (e.g., pitch, yaw, roll) and/or translation (e.g., x, y, and z position values) values associated with the imaging device at this position. In some instances, the imaging device may be in different positions when acquiring the multiple images. The attitude sensor may obtain/determine a pose matrix indicating the rotation and/or translation value (s) of the imaging device when acquiring each of these images.

The extrinsic parameters may be used for localization and/or to calculate position information of the images from the imaging device and scanning device to be in the same 3D coordinate plane. To put it another way, the imaging device may capture a first image and the scanning device may capture a second image. The extrinsic parameters from the attitude sensor may be used to align the first and second images from these two devices such that they are in the same coordinate plane. The 3D modeling system may further include device 200 to process the obtained data and/or include an interface to transmit the obtained data to device 200 for data processing. However, it will be recognized that process 300 may be performed in any suitable environment and that any of the following blocks may be performed in any suitable order.

At block 310, the 3D modeling system obtains a first set of depth data of the scene. To be specific, the imaging device in the 3D modeling system captures a plurality of depth images of the scene. The imaging device may be and/or include one or more cameras, which may include, but is not limited to, a stereo camera, a structured light camera, a time-of-flight (TOF) camera, and/or other types of depth cameras. Each depth image captured by the imaging device comprises a plurality of pixels. Each pixel is associated with a depth data point that includes a depth value, which indicates a distance between the imaging device at a shooting position (e.g., a position of the imaging device when it is acquiring the image) and a spot in the scene. The first set of depth data includes the pixels of the depth images captured by the imaging device.

A scene may be an image of one or more objects and/or imaging areas and the aforementioned scene may be any type of scene that includes any type/number of objects and/or imaging areas. For instance, the scene can be an indoor scene of a house or an outdoor scene of a house. In some instances, at least some of the objects (e.g., a faucet and/or a door handle) in the scene may be captured twice.

For instance, a scene to be captured may include a partial scene A, a partial scene B, and a partial scene C. The size of each partial scene is the field of view of the imaging device. The imaging device may capture two depth images of each partial scene. Additionally, and/or alternatively, if partial scene A and partial scene B include a common object, the imaging device may capture one depth image for partial scene A and one depth image for partial scene B. In such cases, the common object is captured twice in the two depth images.

In some examples, the imaging device may be positioned in different poses (e.g., positions and/or shooting angles) to capture multiple depth images of the scene such that the multiple depth images captured for the partial scenes may cover the entire scene. The imaging device may be moved or rotated to be positioned in different poses. For instance, the imaging device can be placed on a platform. The platform may be configured to move according to a preset motion trajectory. The imaging device may capture a depth image every time the imaging device is moved a preset distance (e.g., 0.2 meters). In some variations, the platform may be configured to rotate around a preset object. The imaging device may capture a depth image every time the imaging device is moved a preset angle (e.g., 10 degrees). Further, the platform may be configured to rotate around a preset object while moving according to a preset motion trajectory. In other words, the imaging device may capture a depth image when the imaging device is rotated/moved a preset distance and/or a preset angle.

In some instances, the 3D modeling system may perform key point detection during or after the process of capturing multiple depth images of the scene. For example, the 3D modeling system may perform the key point detection on one or more depth images captured by the imaging device for a partial scene to identify one or more target objects and/or one or more image areas within the captured depth images as well as determine whether the identified target object requires additional depth data due to one or more factors (e.g., low resolution and/or missing/incomplete data points). For example, a scene may include a target object (e.g., a door handle) and the 3D modeling system may capture one or more depth images of the scene. Each of the depth images may be partial scene (e.g., may include the target object and show a portion of the overall scene). In other words, the 3D modeling system may instruct the imaging device to capture a first depth image of the target object, then instruct the imaging device to capture a next depth image including the target object, and so on. Additionally, and/or alternatively, the 3D modeling system may identify that the target object in the scene requires additional depth data based on the key point detection results (e.g., based on low resolution and/or missing data points). For example, the 3D modeling system may determine the resolution for the target object is below a certain threshold and thus requires additional depth data. In such case, a processor of the 3D modeling system may instruct the imaging device to move to a certain location that is capable of capturing an image of the target object. Then, the processor may instruct the imaging device to capture a depth image of a partial scene to provide additional depth data for the target object. The target object may be a predetermined object (e.g., a user may provide user input indicating the target object). Additionally, and/or alternatively, the target object may be an object that meets a preset condition (e.g., the target object is smaller than a certain volume or area within the image).

At block 320, the 3D modeling system obtains a second set of depth data of the scene. To be specific, the scanning device in the 3D modeling system scans the scene to collect a plurality of depth data points. Each depth data point includes a depth value that indicates a distance between the scanning device and a spot in the scene. In some instances, the scanning device may be a LIDAR system which utilizes an energy source, such as laser, to scan an area and detect the reflected energy caused by bouncing from objects in the scanned area.

Similar to the block 310, the 3D modeling system may perform key point detection during or after the process of the scanning the scene. For example, the 3D modeling system may perform the key point detection on one or more frames of depth data points obtained by the scanning device for a partial scene to identify one or more target objects and/or one or more image areas within the obtained frames as well as determine whether the identified target object requires additional depth data due to one or more factors (e.g., low resolution and/or missing/incomplete data points). Based on the key point detection results (e.g., based on low resolution and/or missing data points), a processor of the 3D modeling system may instruct the scanning device to scan a certain area to provide additional depth data for a target object.

In some instances, the relative position between the imaging device and the scanning device may be fixed. In other instances, the relative position might not be fixed. The relative position between the imaging device and the scanning device may be dynamically determined during the depth data acquisition process when the relative position is not fixed. In such cases, the 3D modeling system may include one or more attitude sensors that output extrinsic parameters to indicate position and rotation information of the imaging device and/or the scanning device. In some variations, the 3D modeling system may include a single attitude sensor for both the imaging device and the scanning device. In other variations, the 3D modeling system may include an attitude sensor for the imaging device and a separate attitude sensor for the scanning device.

At block 330, the 3D modeling system generates a 3D model of the scene based on a set of color data of the scene, the first set of depth data, and the second set of depth data. In some variations, the set of color data of the scene may be obtained based on images of the scene captured by using a color imaging device (e.g., a color camera). In some instances, the color imaging device for capturing the set of color data may be included in the 3D modeling system. In other instances, the set of color data captured by the color imaging device may be transmitted to the 3D modeling system. The images of the scene obtained by the color imaging device may be and/or include red-green-blue (RGB) images, grayscale images, and/or black/white images. The set of color data are formed based on the pixels of the color images (e.g., the set of color data may include RGB values, grayscale values, and/or luminance values). The 3D modeling system may include a processor that is configured to process the received set of color data and the depth data to generate the 3D model of the scene.

In some examples, the 3D modeling system may combine the first set of depth data from the imaging device and the second set of depth data from the scanning device with the aid of pose information corresponding to the imaging device and the scanning device. The processor of the 3D modeling system may obtain extrinsic parameters, which include position and rotation information of the imaging device and the scanning device, from the attitude sensor(s). Based on the extrinsic parameters, the processor may determine and/or calculate positions, rotations, and/or shooting angles of the imaging device and/or the scanning device in the same 3D coordinate plane. For instance, the imaging device obtains a plurality of depth images of the scene. Each depth image is associated with a set of extrinsic parameters indicating the pose of the imaging device at the moment of capturing the depth image. Based on the calculated pose information of the imaging device, the positional relationships among the depth images captured by the imaging device may be determined. As such, the depth images captured by the imaging device may be combined based on the determined positional relationships. Additionally, and/or alternatively, the depth data points obtained by the scanning device may be combined based on the positional relationships determined from the pose information of the scanning device. Additionally, and/or alternatively, the depth images captured by the imaging device and the depth data points obtained by the scanning device may be combined based on the positional relationships determined from the pose information of the imaging device and the scanning device. In this way, the first set of depth data and the second set of depth data may be combined to generate a complete depth image of the scene. Additionally, and/or alternatively, each of the color images captured by the color imaging device may also be associated with a set of extrinsic parameters indicating the pose information of the color imaging device. Similarly, the color images may be combined based on the positional relationships among the color images. Additionally, and/or alternatively, the set of color data formed by the color images may be aligned with the depth data points in the scene based on the positional relationships determined from the pose information of the data acquisition devices. As such, a 3D model of the scene that comprises both depth and color information may be generated.

In some variations, the 3D modeling system may combine the set of color data, the first set of depth data, and the second set of depth data based on the results of key point detection (e.g., based on one or more identified target objects). For example, the 3D modeling system may perform key point detection on each of the depth images included in the first set of depth data to identify a number of target objects. The target objects are captured by at least two depth images from the imaging device such that the depth images may be combined by aligning the identified target objects in the depth images. The second set of depth data from the scanning device may include a plurality of frames. The 3D modeling system may perform key point detection on each of the frames obtained by the scanning device to identify the number of target objects. Similarly, the depth data points obtained by the scanning device may be combined by aligning the identified target objects in the frames. Additionally, and/or alternatively, the first set of depth data and the second set of depth data may be combined by aligning the identified target objects that exist in both the first set of depth data and the second set of depth data. Additionally, and/or alternatively, the 3D modeling system may perform key point detection on the color images included in the set of color data to identify the number target objects. In this way, the set of color data may be aligned with the set of depth data based on the identified target objects that exist in both the set of depth data and the set of color data. As such, the 3D modeling system may combine the set of color data, the first set of depth data, and the second set of depth data by aligning the number of target objects in the scene, so as to generate the 3D model of the scene.

After generating the 3D model, the 3D modeling system outputs the 3D model of the scene to a display. The 3D model of the scene may be utilized for VR applications.

Figure 4:
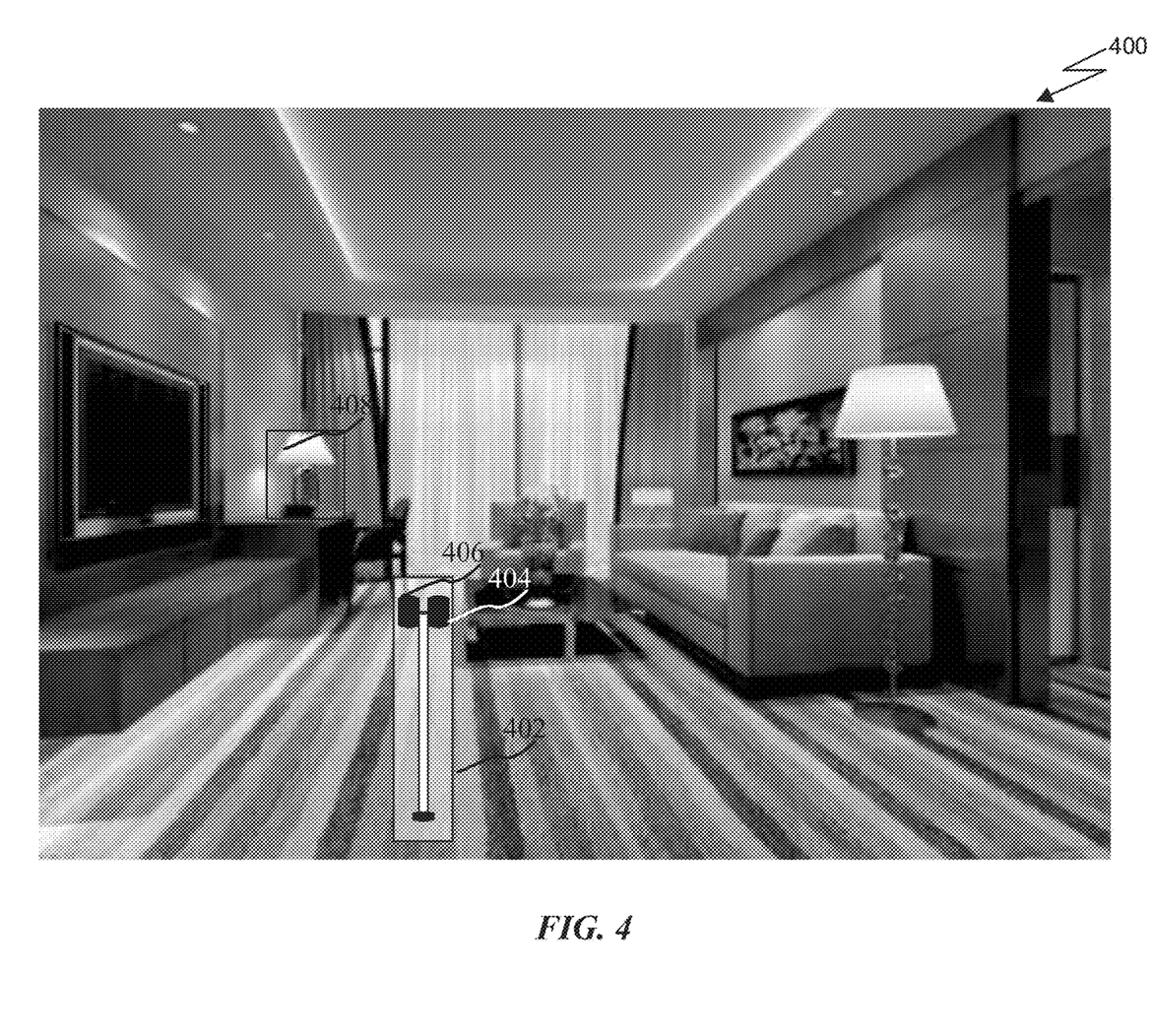
FIG. 4 illustrates an application scenario of generating a 3D model of a scene in accordance with one or more embodiments.

FIG. 4 is an exemplary application of generating a 3D model of a scene 400 in accordance with one or more embodiments. A 3D modeling system 402 comprises an imaging device 404 and a scanning device 406. Imaging device 404 in 3D modeling system 402 captures a plurality of depth images of scene 400 to form a first set of depth data. A depth image may include a partial scene 408 that comprises at least one object. For instance, partial scene 408 comprises a table lamp. In some instances, at least two depth images captured by imaging device 404 comprise partial scene 408. Scanning device 406 scans scene 400 to collect a plurality of depth data points, which form the second set of depth data. Thereafter, 3D modeling system 402 may generate the 3D model of the scene based on a set of color data of the scene, the first set of depth data, and the second set of depth data.

The method, system and apparatus for generating a 3D model of a scene described herein are capable of generating a high-resolution 3D model of a scene with consistent high accuracy for a wide range of distances for the objects in the scene. The high-quality 3D model of the scene is generated by combining depth data obtained from an imaging device, such as a depth camera, and the depth data obtained from a scanning device, such as a LIDAR system.

A depth camera may have the advantages of high resolution and high frame rate. Thus, the depth camera is able to capture fine details for small objects in the scene. However, the depth camera, which may be limited by its power or resolution, is typically used for a relatively close shooting distance. Most depth cameras have a shooting distance ranging from 0.2 to 8 meters, and the maximum shooting distance is generally not more than 10 meters away. Further, the accuracy of acquired depth data by the depth camera depends heavily on the shooting distance. For instance, in examples where the depth camera is a structured light camera, the highest accuracy for the structured light camera can reach the level of millimeters within a shooting range of 0.5 to 3 meters. However, within a shooting range of 3 to 5 meters, the accuracy for the structured light camera degrades to tens of millimeters. When the shooting distance is more than 5 meters, the accuracy for the structured light camera can be worse than 0.5 meters. By contrast, a scanning device such as a LIDAR system typically has a significantly longer detection distance than a depth camera. For instance, commercially available LIDAR systems may have a ranging distance of 10 meters, 30 meters, 100 meters, 300 meters or even longer. Further, the accuracy of the LIDAR system within its detection range is known to be highly accurate with high consistency. However, the LIDAR system usually cannot provide as intensive data points as a depth camera, thus not able to provide fine details of small objects in the scene.

The present disclosure provides method, system and apparatus for combining the depth data from the imaging device and the scanning device, so as to ensure modeling small objects with fine details and distant objects with consistent high accuracy in the scene.

Referring back to block 310 in FIG. 3, the 3D modeling system may be configured to obtain the first set of depth data according to a predefined resolution threshold. The imaging device of the 3D modeling system initially captures a plurality of depth images of the scene while moving and rotating to different locations. A processor of the 3D modeling system processes the depth images captured by the imaging device and obtains an overall depth image of the scene by combining the pixels of the depth images. Thereafter, the processor of the 3D modeling system determines one or more image areas in the scene that have a resolution less than or equal to a predefined resolution threshold, and instructs the imaging device to capture additional depth images for the one or more image areas. Each image area may be included in a partial scene captured in a depth image. For instance, in some variations, the imaging device may be instructed to capture a target number of depth images. The number of depth images captured for a partial scene may be determined based on the complexity of the partial scene. The more complex the partial scene is, the larger number of depth images may be captured for the partial scene. By supplementing the additional depth images for the one or more image areas to the initial depth images captured by the imaging device, the resolution of the one or more image areas can be improved so as to surpass the predefined resolution threshold value. As such, the resulting first set of depth data that includes the pixels of the depth images captured by the imaging device may provide sufficient depth data points for the image areas to meet the resolution requirement.

In some examples, the 3D modeling system may obtain the first set of depth data based on a predefined depth value threshold in accordance with a target accuracy. For example, the imaging device may be used to accurately capture data points/objects between the distances of 0.3 meters to 2.3 meters, with a maximum error of 0.5 centimeters for the depth value between the distances of 0.3 meters to 2.3 meters. Therefore, the depth value threshold may be 2.3 meters and any depth data values indicating a value greater than 2.3 meters may be flagged by the 3D modeling system as potentially not meeting the target accuracy. Additionally, and/or alternatively, a user may set the depth value thresholds based on how accurate they would like the image to be. In other words, the first set of depth data may be tailored according to the predefined depth value threshold. For instance, each data point that has a depth value greater than the depth value threshold may be removed from the first set of depth data. The depth value threshold may be determined based on the accuracy of the imaging device that is included in the 3D modeling system. The accuracy of the imaging device may be obtained by calibrating the imaging device or from the relevant parameters provided by the manufacturer. The calibration may be performed by placing the imaging device at multiple shooting distances away from a target object to capture a plurality of depth images at each of the shooting distances. For instance, the imaging device may have a shooting range of 0.3 meters to 4 meters and the shooting distances may be set between 0.3 meters and 4 meters with a predefined increment (e.g., 0.1 meters). The depth values included in the pixels of the depth images may be compared with the actual distances between the imaging device and the target object such that the accuracy of the imaging device at different shooting distances may be calibrated. For instance, at a shooting distance of 0.3 meters, the error for the depth value may be 0.3 centimeters; at a shooting distance of 0.8 meters, the error for the depth value may be 0.2 centimeters; at a shooting distance of 1.3 meters, the error for the depth value may be 0.1 centimeters; at a shooting distance of 1.8 meters, the error for the depth value may be 0.3 centimeters; at a shooting distance of 2.3 meters, the error for the depth value may be 0.5 centimeters; at a shooting distance of 2.8 meters, the error for the depth value may be 1 centimeters; at a shooting distance of 3.3 meters, the error for the depth value may be 5 centimeters; and at a shooting distance of 3.8 meters, the error for the depth value may be 10 centimeters. In this example, if the target accuracy is set to be 0.5 centimeters, the depth value threshold may be defined as 2.3 meters.

The depth value threshold may be modified during the data processing according to the accuracy and/or resolution requirements for generating the 3D model. For instance, a smaller depth value threshold may be determined due to a higher accuracy requirement, which may result in fewer data points in the first set of depth data thus trading off the resolution of the depth image. In another instance, a larger depth value threshold may cause more data points included in the first set of depth data thus ensuring higher resolution of the depth image. However, in such cases, the accuracy requirement may have to be relaxed. Additionally, and/or alternatively, the depth value threshold may be applied to tailor the second set of depth data as well. For instance, the depth data points in the second set of depth data may be removed, when the depth data points have depth values smaller than the depth value threshold.

In some examples, the processor of the 3D modeling system may process the first set of depth data to reduce the number of depth data points in the first set of depth data such that the data processing described in block 330 of FIG. 3 may be improved with increased processing speed and reduced computational complexity. The data processing includes at least one of down-sampling and filtering. In some examples, the process of down-sampling may be performed by merging overlapping pixels of the depth images. For instance, the overlapping pixels that are related to a same shooting spot in the scene may be merged to one depth data point by averaging the depth values of the overlapping pixels. Such process of merging multiple data points to one data point is equivalent to a process of averaging results from repeated sampling, which reduces errors caused by jittering of data points according to a Gaussian distribution. Further, the process of filtering may be performed to remove unexpected depth data points, such as flying spots, by applying a filtering algorithm. Similar data processes to reduce the number of data points may be applied to the second set of depth data obtained by the scanning device comprised in the 3D modeling system as described in block 320 of FIG. 3.

In some examples, after block 330, the 3D modeling system may determine that the generated 3D model includes one or more image areas that cannot reach the predefined resolution threshold. For instance, the one or more image areas may include objects that are not generated with sufficient data points in the scene. The processor of the 3D modeling system may instruct the imaging device to capture additional depth images for the one or more image areas. In some examples, the imaging device may be moved and/or rotated to capture the depth images from multiple shooting angles for each of the one or more image areas such that richer depth data may be obtained for the one or more image areas. The pixels of the additional depth images captured by the imaging device may form a first set of filling data. The processor of the 3D modeling system may supplement the first set of filling data to the generated 3D model in order to generate a new 3D model of the scene, thereby improving the degree of refinement of the local details.

In some examples, the 3D modeling system may display a 3D model of the scene in real time based on the obtained depth data. The display of the 3D model of the scene may be available during the aforementioned processes of data acquisition, such as blocks 310 and 320, the process of data processing, such as block 330, and/or the process of generating a new 3D model by capturing more depth images. A user may determine, based on the real-time display of the 3D model, whether the presented 3D model meets the requirements of accuracy, resolution and/or completeness. For example, the user may decide whether additional depth data are needed, and which of the imaging device and the scanning device comprised in the 3D modeling system should be used to obtain the additional depth data.

Figure 5:
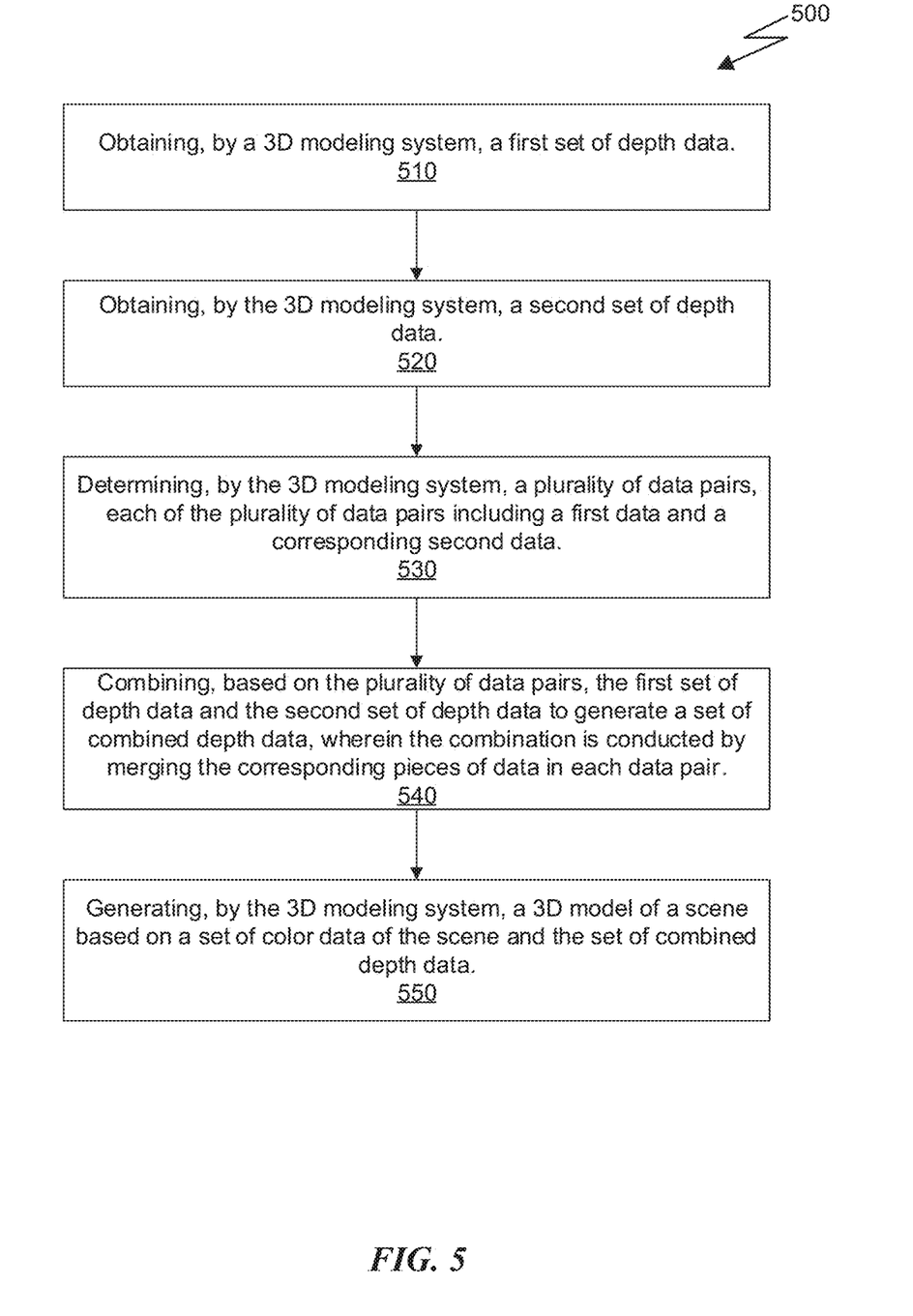
FIG. 5 illustrates a process for generating a 3D model of a scene in accordance with one or more embodiments.

FIG. 5 is an exemplary process 500 for generating a 3D model of a scene in accordance with one or more embodiments. Process 500 may be performed by the aforementioned 3D modeling system and/or device 200 according to the computer-executable instructions stored in memory 230 shown in FIG. 2. However, it will be recognized that process 500 may be performed in any suitable environment and that any of the following blocks may be performed in any suitable order. As compared to process 300, process 500 may include additional blocks that determine a plurality of data pairs and use the data pairs to combine the first and second sets of depth data from the imaging device and the scanning device.

At block 510, the 3D modeling system obtains the first set of depth data. Block 510 may be similar to block 310, which is described above. Additionally, and/or alternatively, the imaging device of the 3D modeling system may capture the depth images at a first frame rate (e.g., a number of depth images per second captured by the imaging device). Each of the frames includes a plurality of pixels. The first set of depth data includes a plurality of frames captured by the imaging device. Each frame of depth image included in the first set of depth data may be defined as a first data.

At block 520, the 3D modeling system obtains the second set of depth data. Block 520 may be similar to block 320, which is described above. Further, the scanning device of the 3D modeling system may collect the depth data points at a second frame rate. Each frame includes a plurality of depth data points collected by the scanning device such that the second frame rate may indicate the number of data points collected by the scanning device per second. The second set of depth data includes a plurality of frames of depth data points collected by the scanning device. Each frame included in the second set of depth data may be defined as a second data.

At block 530, the 3D modeling system determines a plurality of data pairs, and each of the plurality of data pairs includes a first data and a corresponding second data. For instance, a first data, which is a frame of depth image, is captured for an image area that is included in a partial scene. The image area may be an object in the scene. The corresponding second data may be determined as a frame obtained by scanning a partial scene that includes the same image area. It should be noted that the partial scene captured by the first data and the partial scene obtained by the second data may or may not be identical.

In some examples, the imaging device and the scanning device in the 3D modeling system may be integrated on a platform, as such the relative position of the imaging device with respect to the scanning device may be fixed. In such examples, the platform may be further integrated with an attitude sensor, which provides extrinsic parameters to indicate pose information, such as position and rotation information, of the platform. There may be communication connections established among the platform, the imaging device, the scanning device and the attitude sensor such that each frame of depth image obtained by the imaging device, which is a first data, may be tagged with a set of extrinsic parameters provided by the attitude sensor at the moment of capturing the frame of depth image. The moment of capturing the frame of depth image may be labeled by the imaging device as a timestamp associated with the frame of depth image. Further, the extrinsic parameters output from the attitude sensor may be labeled with a timestamp generated by the attitude sensor, where the timestamp indicates the moment of generating the extrinsic parameters by the attitude sensor. Based on the timestamp information, the 3D modeling system may determine a set of extrinsic parameters to be tagged to a frame of depth image based on the time interval between the timestamp of the extrinsic parameters and the timestamp of the captured image(s) being smaller than a predefined threshold. Similarly, each frame of depth data points obtained by the scanning device may be tagged with a set of extrinsic parameters provided by the attitude sensor at the moment of scanning the frame of depth data points. The frame of depth data points obtained by the scanning device are labeled with timestamps generated by the scanning device to indicate the moments of generating the frame of depth data points. Based on the timestamp information, the 3D modeling system may determine the set of extrinsic parameters to be tagged to a frame of depth data points scanned by the scanning device, when the time interval is smaller than a predefined threshold.

In some examples, the platform may be moved/rotated to different positions for data acquisition. When the platform is moved/rotated to one of the positions for data acquisition, the imaging device may be instructed to capture one or more frames of depth images, the scanning device may be instructed to scan one or more frames of depth data points, and the attitude sensor may be instructed to output a set of extrinsic parameters indicating the current position and rotation of the platform. The one or more frames of the depth images captured by the imaging device at this position may form a first data. The first data is tagged with the set of extrinsic parameters output from the attitude sensor for this position. Additionally, and/or alternatively, the one or more frames of the depth data points scanned by the scanning device at this position may form a second data. The second data is tagged with the set of extrinsic parameters output from the attitude sensor for this position. The 3D modeling system may determine the first data obtained at this position corresponds to the second data obtained at the same position. By repeating the foregoing data acquisition processes at different shooting positions by moving/rotating the platform, a plurality of data pairs, that each includes a first data and a corresponding second data, may be obtained. In some examples, the platform may be fixed at a location in the scene and rotated by 360 degrees to perform data acquisition for the entire scene. In some examples, the platform may be handheld by or placed on a user, and data acquisition may be performed according to the movement of the user. In some examples, the platform may be placed on a mobile device, such as a robot or a self-driving car. It will be appreciated that the motion trajectory of the platform should not be limited in this disclosure. In some examples, the platform may be further integrated with a color imaging device. Similarly, the images captured by the color imaging device may be tagged with extrinsic parameters output from the attitude sensor.

The attitude sensor may be at least one of an inertial measurement unit (IMU), a simultaneous localization and mapping (SLAM) unit in a LIDAR system, and a visual inertial odometry (VIO) unit in a color camera. The platform included in the 3D modeling system may include one or more attitude sensors. Each of the imaging device, the scanning device and optionally the color imaging device may include a separate attitude sensor. A set of extrinsic parameters tagged with a first data, a second data, or an image capture by a color imaging device may be a combination of extrinsic parameters output from multiple attitude sensors. In some examples, the set of extrinsic parameter may be output from both an IMU and a SLAM unit. In some examples, the set of extrinsic parameters may be output from both an IMU and an VIO unit. In some examples, the set of extrinsic parameters may be output from an IMU, a SLAM unit and a VIO unit. The set of extrinsic parameters tagged to the first data, the second data or the image captured by the color imaging device may be used to calculate/determine the poses of the data acquisition devices onto a same 3D coordinate plane.

In some examples, the 3D modeling system may determine a data pair according to a preset time interval threshold. For instance, the first data and the corresponding second data that are included in a data pair may be obtained within a time interval that is below the preset time interval threshold. Based on the time interval between the first data and the second data being below a threshold, the first data and the corresponding second data may include depth data points for a same partial scene. As such, the 3D modeling system may rely on the present time interval threshold to determine the plurality of data pairs, where each of the data pairs includes a first data and a corresponding second data.

In some examples, the 3D modeling system may determine a data pair based on key point detections performed on the first data and the second data. The 3D modeling system may identify the same image areas in the first data and the corresponding second data by performing key point detections on the first data and the second data. The identification of the image areas may be based on a number of feature points. The feature points may be predefined by the user. For instance, in some variations, the feature points may be pixels identified in an image that have a dramatic change in grayscale, that are points of intersection at edges, and/or target objects. The 3D modeling system may rely on the key point detection results to determine a first data includes an image area that is also included in a second data, so as to determine a data pair. As such, the 3D modeling system may determine the plurality of data pairs.

At block 540, the 3D modeling system combines the first set of depth data and the second set of depth data to generate a set of combined depth data based on the plurality of data pairs. To be specific, for each data pair, the first data and the corresponding second data are combined.

For example, the 3D modeling system may use the feature points/target objects, the pose information, and/or extrinsic parameters from the attitude sensor for combining the first and second set of depth data. For instance, the 3D modeling system may determine a first set of depth data and a second set of depth data that have the same or substantially the same pose information (e.g., the translational/rotation vectors are substantially the same). The 3D modeling system may combine the first and second set of depth data with the similar pose information to generate a set of combined depth data. Additionally, and/or alternatively, the 3D modeling system may determine one or more feature points and/or target objects that are shown through multiple images/frames. The 3D modeling system may determine the first and second set of depth data associated with the feature points and/or target objects and then combine the first and second set of depth data associated with the feature points and/or target objects to generate a set of combined depth data. Additionally, and/or alternatively, the 3D modeling system may use the extrinsic parameters to generate a set of combined depth data that has a same coordinate plane (e.g., transpose the first and second set of depth data onto a same coordinate plane and then combine the first and second set of depth data based on coordinates within the same coordinate plane).

At block 550, the 3D modeling system generates a 3D model of the scene based on a set of color data of the scene and the set of combined depth data. Each of the data points in the generated 3D model of the scene comprises a depth value and a color value. The set of combined depth data comprises frames of depth images captured by the imaging device, or frames of depth data points scanned by the scanning device. Each frame includes a partial scene. In some examples, the partial scenes included in the frames may be combined according to the positional relationships among the partial scenes. The positional relationships among the partial scenes may be designed in advance. For instance, the motion trajectory of the platform that carries the imaging device and the scanning device may be predefined. The positional relationships among the partial scenes may be determined based on the predefined motion trajectory of the platform. Similarly, the partial scenes included in the set of color data may be combined based on the predefined motion trajectory of the color imaging device used for obtaining the color images that form the set of color data. Alternatively, the positional relationships among the partial scenes may be dynamically determined during the data acquisition process, based on either the extrinsic parameters tagged with the frames of the acquired data, or the identified image areas included in different frames.

In some examples, the depth values of the data points in the 3D model of the scene are determined based on the set of combined depth data that is transposed onto a same coordinate plane during the aforementioned data processing step. Similarly, the set of color data may be transposed onto the same coordinate plane based on the extrinsic parameters indicating the position and rotation of the color imaging device while capturing the color images. As such, each of the data points in the 3D model of the scene is rendered according to a color value included in a color data point that is determined to be at the same coordinates as the data point in the 3D model of the scene.

In some examples, the 3D modeling system determines a depth value and a color value for a data point in the generated 3D model of the scene by aligning the identified one or more image areas that exist in both the set of combined depth data and the set of color data.

Figure 6:
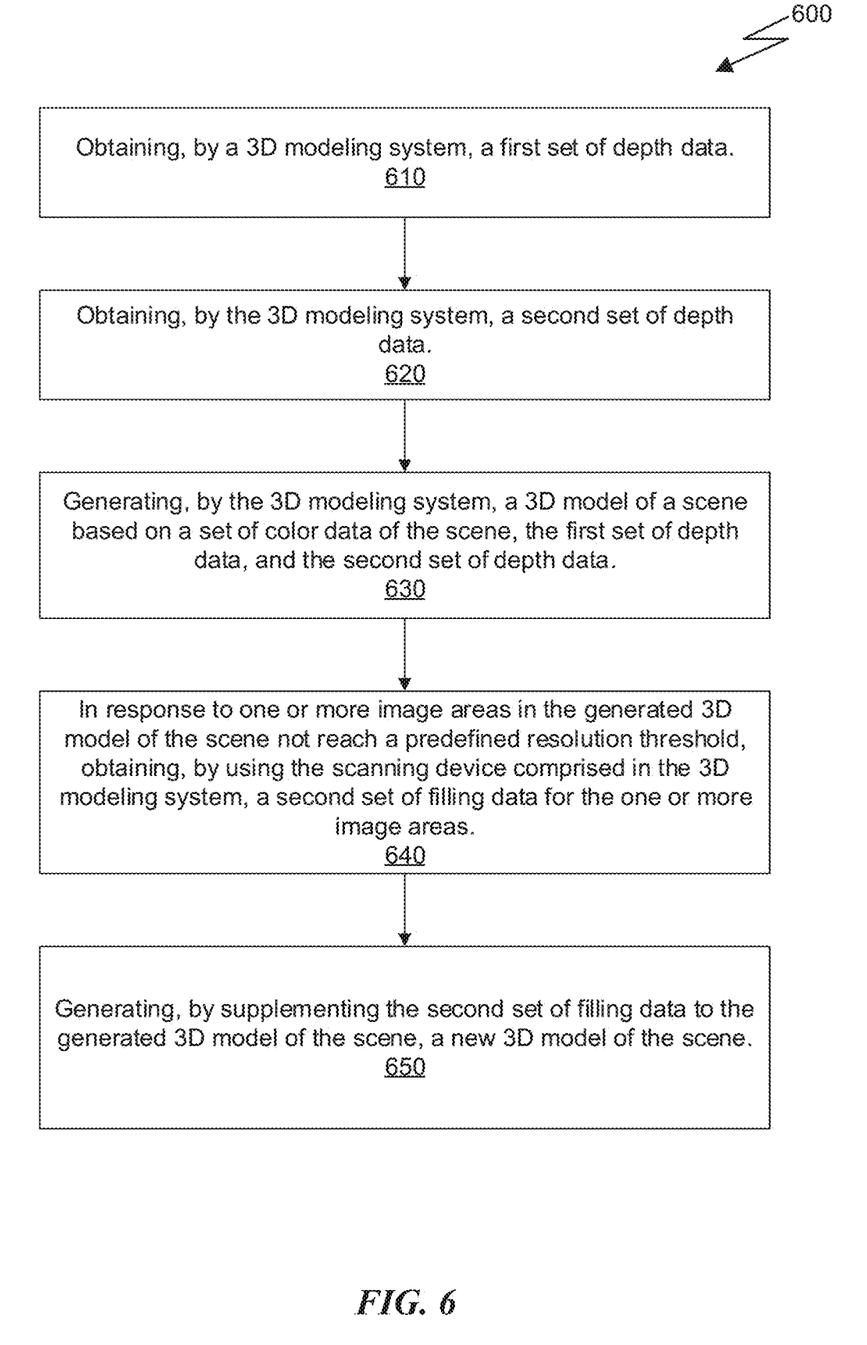
FIG. 6 illustrates a process for generating a 3D model of a scene in accordance with one or more embodiments.

FIG. 6 is an exemplary process 600 for generating a 3D model of a scene in accordance with one or more embodiments. Process 600 may be performed by the aforementioned 3D modeling system and/or device 200 according to the computer-executable instructions stored in memory 230 shown in FIG. 2. However, it will be recognized that process 600 may be performed in any suitable environment and that any of the following blocks may be performed in any suitable order. As compared to process 300, process 600 may include additional blocks that determines a lack of resolution and/or incomplete data within the original set of obtained first/second set of depth data, and then supplements the original set of obtained depth data with new depth data.

At block 610, the 3D modeling system obtains the first set of depth data. Block 610 may be similar to block 310, which is described above.

At block 620, the 3D modeling system obtains the second set of depth data. Block 620 may be similar to block 320, which is described above.

At block 630, the 3D modeling system generates a 3D model of the scene based on a set of color data of the scene, the first set of depth data, and the second set of depth data. Block 630 may be similar to block 330, which is described above.

At block 640, the processor of the 3D modeling system instructs the scanning device to obtain a second set of filling data, in response to determine that one or more image areas do not have sufficient data points in the 3D model of the scene (e.g., based on low resolution and/or missing/incomplete data). The processor of the 3D modeling system may instruct the scanning device to scan for additional depth data points for the one or more image areas. In some examples, the scanning device may be moved and/or rotated to scan the partial scenes including the one or more image areas. The depth data points obtained by scanning the one or more image areas may form a second set of filling data.

At block 650, the processer of the 3D modeling system supplements the second set of filling data to the generated 3D model in order to generate a new 3D model of the scene, thereby improving the completeness of the generated 3D model of the scene.

Figure 7:
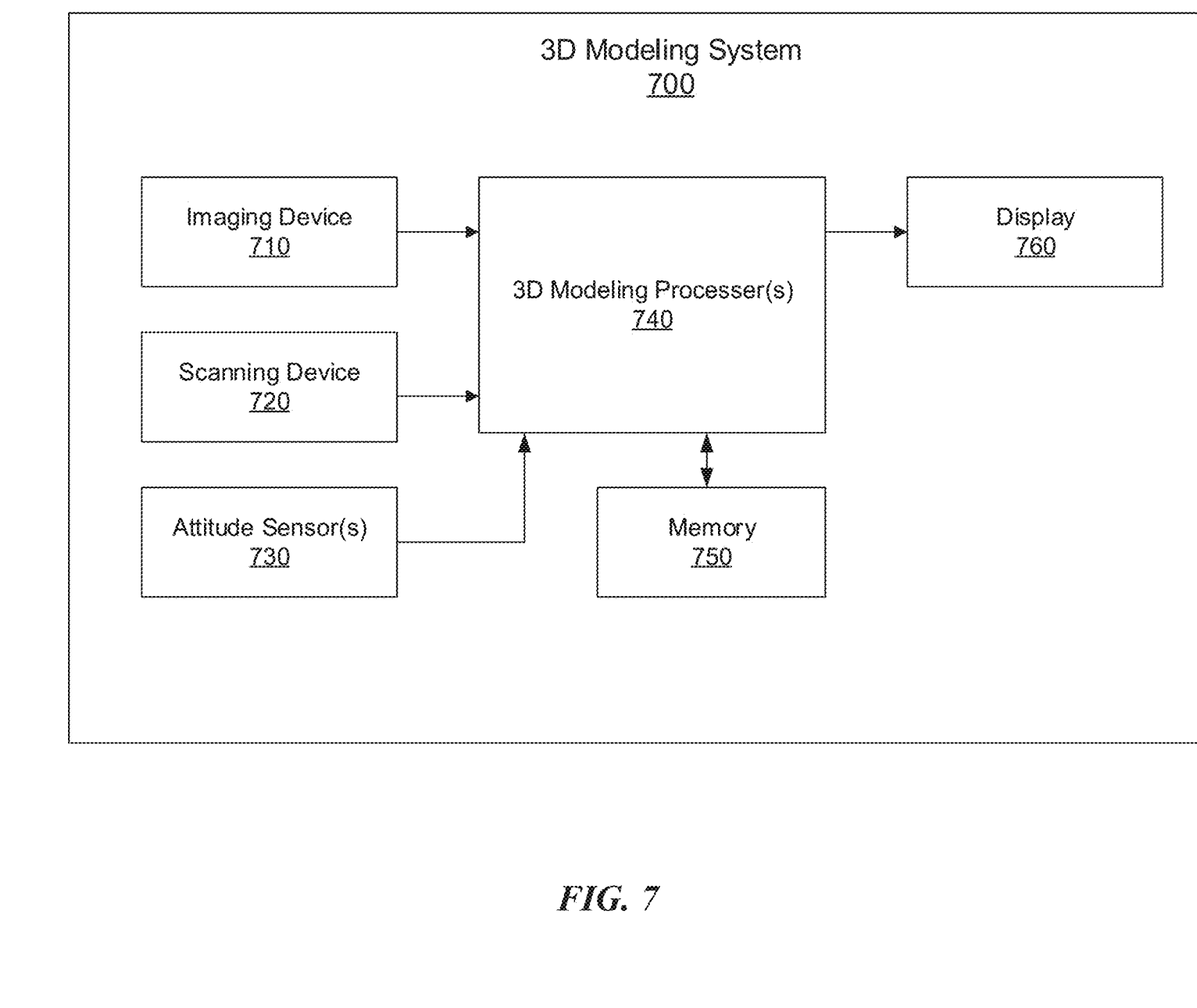
FIG. 7 illustrates a system for generating a 3D model of a scene in accordance with one or more embodiments.

The foregoing disclosed processes may be carried on by a 3D modeling system 700 as illustrated in FIG. 7 in accordance with one or more embodiments. 3D modeling system 700 may comprise multiple components such as an imaging device 710, a scanning device 720, one or more attitude sensors 730, one or more 3D modeling processors 740, a memory 750 and display 760.

Imaging device 710 is configured to capture a plurality of depth images of a scene. Imaging device 710 may be set to capture the depth images of the scene at a first frame rate. Each depth image comprises a plurality of pixels and the pixels include depth values indicating distances between imaging device and a plurality of shooting spots in the scene. Further, each depth image may be labeled with a timestamp which indicates the moment of capturing the depth image. Imaging device 710 outputs the captured depth images of the scene as the first set of depth data or the first set of filling data to 3D modeling processers 740.

Scanning device 720 is configured to scan for a plurality of depth data points of the scene. Scanning device 720 may be set to obtain the depth data points of the scene at a second frame rate. Each frame comprises a plurality of depth data points and the depth data points include depth values indicating distances between scanning device 720 and a plurality of spots in the scene. Further, each frame of depth data points may be labeled with a timestamp which indicates the moment of obtaining the frame. Scanning device 720 outputs the obtained depth data points to as the second set of depth data or the second set of filling data to 3D modeling processers 740.

Attitude sensor 730 is configured to determine and/or output extrinsic parameters for the acquired depth data. The extrinsic parameters include pose information, such as position and rotation, of the device that is embedded with attitude sensor 730. The extrinsic parameters generated by attitude sensor 730 may be labeled with a timestamp which indicates the moment of generate a set of extrinsic parameters. The data acquisition devices, such as imaging device 710 and scanning device 720, may each be embedded with an attitude sensor 730. Alternatively, one attitude sensor 730 may output the extrinsic parameters that will be later determined for each frame of the obtained depth data. Attitude sensor 730 may output the extrinsic parameters labeled with timestamps to 3D modeling processers 740, such that 3D modeling processers 740 may determine a set of extrinsic parameters being tagged to a frame of acquired data based on the time interval indicated by the timestamps.

3D modeling processor 740 is configured to perform the aforementioned processes based on the computer-executable instructions stored in memory 750. In some examples 3D modeling processer 740 receives the set of color data from an external color imaging device. In some examples, 3D modeling processer 740 receives the set of color data from a color imaging device that is included within 3D modeling system 700.

Display 760 is configured to display a 3D model of the scene that is generated by 3D modeling process 740. In some examples, display 760 may be further configured to display a real-time 3D model of the scene during the data acquisition processes.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for generating a 3D model of a scene, comprising:
    obtaining, by a 3D modeling system comprising an imaging device, a first set of depth data, wherein the first set of data comprises pixels of a plurality of frames of depth images;
    obtaining, by the 3D modeling system comprising a scanning device, a second set of depth data, wherein the second set of depth data comprises depth data points of a plurality of image frames;
    determining a depth value threshold indicating a depth value;
    removing one or more data points in the first set of depth data in response to the depth value of the one or more data points being greater than the depth value indicated by the depth value threshold;
    determining a plurality of data pairs, wherein each of the plurality of data pairs comprises first data indicating a depth image within the first set of depth data and corresponding second data indicating an image frame within the second set of depth data, and the first data and the corresponding second data indicate an identical target object;
    determining a positional relationship between the first set of depth data and the second set of depth data based on the plurality of data pairs;
    receiving, by the 3D modeling system, a set of color data of the scene, wherein the set of color data comprises pixels of a plurality of color images;
    generating, by the 3D modeling system, the 3D model of the scene based on the set of color data, the first set of depth data, and the second set of depth data;
    causing display of the 3D model of the scene;
    determining one or more image areas in the generated 3D model of the scene below a resolution threshold;
    obtaining, by the imaging device comprised in the 3D modeling system, a first set of filling data comprising pixels of a plurality of depth images associated with the one or more image areas, wherein the first set of filling data is different from the first set of depth data; and
    supplementing the first set of filling data to the generated 3D model to generate a new 3D model of the scene.

2. The method according to claim 1, wherein each first data is tagged with a first set of extrinsic parameters indicating the pose information of the imaging device, and each second data is tagged with a second set of extrinsic parameters indicating the pose information of the scanning device, and wherein the determining the plurality of data pairs further comprising:

determining a first pose related to the first data based on the first set of extrinsic parameters;

determining a second pose related to the second data based on the second set of extrinsic parameters; and determining the data pair including the first data and the second data in response to the first pose and the second pose are identical.

3. The method according to claim 2, wherein the first set of extrinsic parameters and a second set of extrinsic parameters are output from a same attitude sensor comprised in the 3D modeling system.

4. The method according to claim 1, wherein each first data is labeled with a first timestamp indicating the moment of obtaining the first data by the imaging device, and each second data is labeled with a second timestamp indicating the moment of obtaining the second data by the scanning device, and wherein the first data and the corresponding second data in a data pair have a time interval smaller than a threshold.

5. The method according to claim 1, wherein the first data and the corresponding second data in a data pair are identified with one or more identical objects.

6. The method according to claim 1, the method further comprising:

determining one or more image areas in the generated 3D model of the scene that do not have sufficient depth data points;

obtaining, by the 3D modeling system comprising the scanning device, a second set of filling data, the second set of filling data comprising depth data points of a plurality of image frames; and supplementing the second set of filling data to the generated 3D model to generate a new 3D model of the scene.

7. The method according to claim 1, wherein the imaging device obtains the plurality of depth images at a first frame rate, and the scanning device obtains the plurality of image frames at a second frame rate.

8. The method according to claim 1, wherein the 3D modeling system comprises a display that displays the 3D model of the scene based on the obtained depth data in real time.

9. The method according to claim 1, wherein the imaging device has a depth range that is smaller than a depth range of the scanning device.

10. The method according to claim 1, wherein determining the positional relationship between the first set of depth data and the second set of depth data is further based on extrinsic parameters indicating first position and rotation information of the imaging device and second position and rotation information of the scanning device.

11. A system for generating a 3D model of a scene, comprising:

an imaging device configured to obtain a first set of depth data, wherein the first set of depth data comprises pixels of a plurality of frames of depth images;

a scanning device configured to obtain a second set of depth data, wherein the second set of depth data comprises depth data points of a plurality of image frames; and one or more processors configured to:

receive the first set of depth data from the imaging device, the second set of depth data from the scanning device, and a set of color data, wherein the set of color data comprises pixels of a plurality of color images;

determine a depth value threshold indicating a depth value;

remove one or more data points in the first set of depth data in response to the depth value of the one or more data points being greater than the depth value indicated by the depth value threshold;

determine a plurality of data pairs, wherein each of the plurality of data pairs comprises first data indicating a depth image within the first set of depth data and corresponding second data indicating an image frame within the second set of depth data, and the first data and the corresponding second data indicate an identical target object;

determine a positional relationship between the first set of depth data and the second set of depth data based on the plurality of data pairs;

generate the 3D model of the scene based on the set of color data, the first set of depth data, and the second set of depth data;

output the generated 3D model of the scene;

determine one or more image areas in the generated 3D model of the scene below a resolution threshold;

receive, from the imaging device, a first set of filling data comprising pixels of a plurality of depth images associated with the one or more image areas, wherein the first set of filling data is different from the first set of depth data; and supplement the first set of filling data to the generated 3D model to generate a new 3D model of the scene.

12. The system according to claim 11, wherein the system further comprises one or more attitude sensors configured to output extrinsic parameters indicating pose information of the imaging device and the scanning device comprised in the 3D modeling system, wherein each first data is tagged with a first set of extrinsic parameters indicating the pose information of the imaging device, and each second data is tagged with a second set of extrinsic parameters indicating the pose information of the scanning device, and wherein the one or more processors are further configured to:

determine a first pose related to the first data based on the first set of extrinsic parameters;

determine a second pose related to the second data based on the second set of extrinsic parameters; and determine the data pair including the first data and the second data in response to the first pose and the second pose are identical.

13. The system according to claim 11, wherein each first data is labeled with a first timestamp indicating the moment of obtaining the first data by the imaging device, and each second data is labeled with a second timestamp indicating the moment of obtaining the second data by the scanning device, and wherein the first data and the corresponding second data in a data pair have a time interval smaller than a threshold.

14. The system according to claim 11, wherein the first data and the corresponding second data in a data pair are identified with one or more identical objects.

15. The system according to claim 11, wherein the one or more processors are further configured to:

determine one or more image areas in the generated 3D model of the scene that do not have sufficient depth data points;

receive, from the scanning device, a second set of filling data, the second set of filling data comprising depth data points of a plurality of image frames; and supplement the second set of filling data to the generated 3D model to generate a new 3D model of the scene.

16. A non-transitory computer-readable medium, having computer-executable instructions stored thereon, the computer-executable instructions, when executed by one or more processors, cause a processor to facilitate:

obtaining, by a 3D modeling system comprising an imaging device, a first set of depth data, wherein the first set of data comprises pixels of a plurality of frames of depth images;

obtaining, by the 3D modeling system comprising a scanning device, a second set of depth data, wherein the second set of depth data comprises depth data points of a plurality of image frames;

determining a depth value threshold indicating a depth value;

removing one or more data points in the first set of depth data in response to the depth value of the one or more data points being greater than the depth value indicated by the depth value threshold;

determining a plurality of data pairs, wherein each of the plurality of data pairs comprises first data indicating a depth image within the first set of depth data and corresponding second data indicating an image frame within the second set of depth data, and the first data and the corresponding second data indicate an identical target object;

determining a positional relationship between the first set of depth data and the second set of depth data based on the plurality of data pairs;

receiving, by the 3D modeling system, a set of color data of the scene, wherein the set of color data comprises pixels of a plurality of color images;

causing display of a guidance user interface (UI) comprising an indicator corresponding to the target viewpoint in the field of view at the current viewpoint;

generating, by the 3D modeling system, the 3D model of the scene based on the set of color data, the first set of depth data, and the second set of depth data;

causing display of the 3D model of the scene;

determining one or more image areas in the generated 3D model of the scene below a resolution threshold;

obtaining, by the imaging device comprised in the 3D modeling system, a first set of filling data comprising pixels of a plurality of depth images associated with the one or more image areas, wherein the first set of filling data is different from the first set of depth data; and supplementing the first set of filling data to the generated 3D model to generate a new 3D model of the scene.

* * * * *